Patented Nov. 30, 1948

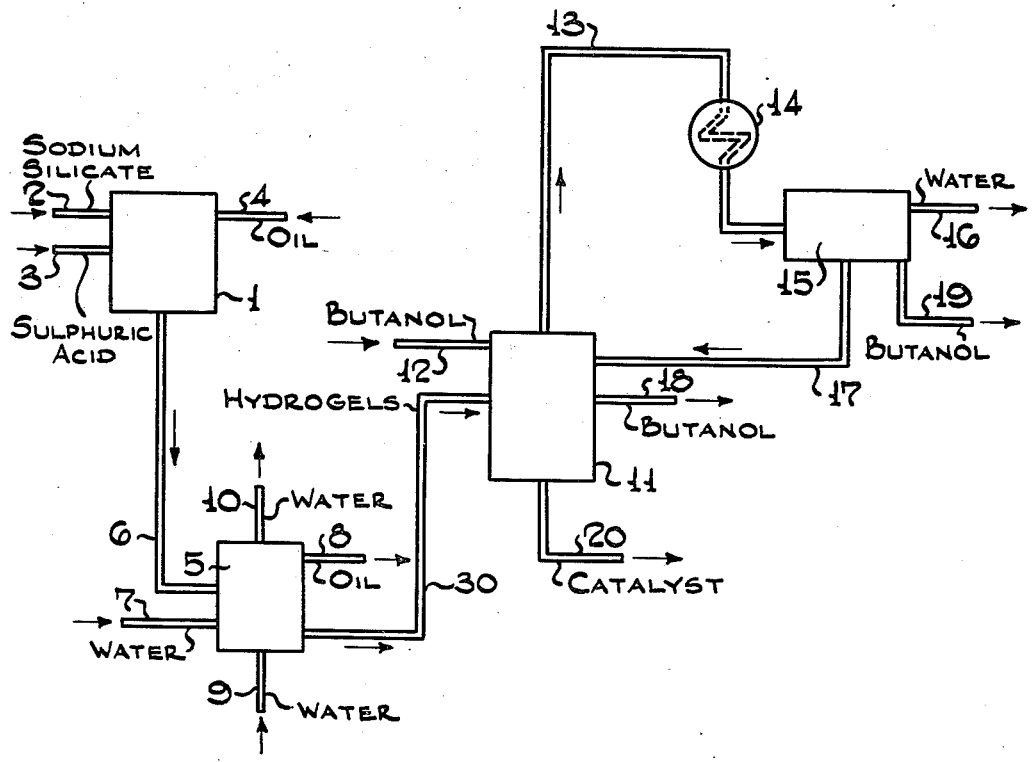

UNITED STATES PATENT OFFICE 2,454,941

DRYING HYDROGEL CATALYSTS BY DISTILLING WITH BUTANOL

Jerry A. Pierce and Charles N. Kimberlin, Jr., Baton Rouge, La., assignors to Standard Oil Development Company, a corporation of Delaware Application February 25, 1944, Serial No. 523,938

6 Claims. (Cl. 252—254)

This invention relates to a process for the drying of hydrous oxides in suspension and more particularly it relates to the manufacture of an improved gel having an apparent density above 0.3.

Inorganic gels are well known and have been long used for various purposes, for example for the adsorption of condensable vapors from gaseous carriers and for catalytic purposes either as the catalyst itself or as a component thereof or as a carrier. The most widely used of these inorganic gels in the dried condition is that of silica with or without the addition of other gelatinous materials such as alumina.

Such gels have been found to be particularly useful as catalysts for carrying out reactions involving hydrocarbons and particularly in the so-called fluid catalyst process in which the catalyst is in a powdered form and is aerated or fluidized by means of a gas so that it acquires the properties of a liquid such as fluid flow, hydrostatic pressure and the like. The hydrostatic pressure property of these powdered catalysts is made use of in circulating the powdered catalyst through the system. These powdered catalysts are generally prepared by grinding silica gel or other types of gel catalysts to the desired size. It has recently been found that catalysts having a particle size within the desired range for the fluid catalyst process, that is between 20 and 120 microns can be prepared by causing a sol of the desired gel-forming substance to set while dispersed in a water-immiscible medium such as oil whereby small spherical particles having diameters less than 1 mm. are obtained. These microspheres thus obtained are washed and dried usually in air and then heated to a temperature of about 850–1200° F. However, when these spheres are dried in this manner it is found that they tend to agglomerate so that the advantage of the spherical form is lost. Furthermore, it is found that the activity of the spheres thus dried is rather low. This is indicated by the relatively high apparent density and correspondingly low average pore size. Similarly the carbon-forming tendency of the catalyst appears to be high. The carbon-forming tendency may be reduced by steaming the catalyst at 850° F. but this is undesirable as the steam destroys the small pores and reduces the activity of the catalyst.

It is therefore one object of this invention to prepare a catalyst having a low apparent density suitable for use in the fluid catalyst process.

It is another object of this invention to provide a method for drying a hydrogel and simultaneously controlling the pore size of the final product.

It is a further object of this invention to produce catalysts having increased activity and increased heat and steam stability.

Another object of this invention is to prepare a catalyst which is subject to less carbon formation.

Still another object of this invention is to dry hydrogel spheres under such conditions that they do not agglomerate to form larger particles.

These and other objects of this invention are attained by first forming the hydrogel of the desired gel-forming substance and then displacing the water from the hydrogel by means of a partially water-miscible liquid having a low surface tension in comparison with water. For example the hydrogel may be washed with the partially water-miscible liquid, the excess decanted off and the gel dried. However, excellent results have been obtained by refluxing the hydrogel with the partially water-miscible liquid and removing the water as an azeotrope with the partially water-miscible liquid. The condensate is then allowed to stratify to form a layer of water and a layer of the partially water-miscible liquid. The separated water is removed and the partially water-miscible liquid is recycled. This process is continued until all of the water is removed from the hydrogel after which the excess of partially water-miscible liquid is removed from the gel and the gel dried. Excellent results have also been obtained by treating the hydrogel with the partially water-miscible liquid at a temperature at which the miscibility of the liquid with water is substantially increased, removing the aqueous solution thus formed, adjusting the temperature to a point at which the greater portion of the water separates and recycling. This is continued until all of the water is removed from the hydrogel after which the gel is dried.

The present invention may be readily understood by reference to the attached drawing illustrating one modification of the same. A silica sol is prepared by mixing sodium silicate in reaction zone 1 with an equal volume of sulphuric acid. The sodium silicate is introduced by means of line 2, while the sulphuric acid is introduced by means of line 3. This mixture is then stirred with mineral oil which is introduced into reaction zone 1 by means of line 4. The resulting emulsion is agitated for a sufficient length of time and then introduced into reaction zone 5 by means of line 6. Water is introduced into reaction zone 5 by means of line 7 and the hydrogel transferred from an oleaginous to an aqueous suspension. The oil layer is withdrawn from reaction zone 5 by means of line 8 and handled in any manner desirable. The hydrogel microspheres of silica are washed free of sulphate ion by upward percolation with distilled water which is introduced into reaction zone 5 by means of line 9 and withdrawn by means of line 10. The hydrogel thus formed is removed from reaction zone 9 by means of line 30 and passed into drying zone 11.

It is to be understood that the hydrogels may be further treated or impregnated with aluminum in the reaction zone 5 prior to washing with water and prior to introducing the same into drying zone 11.

The hydrogel introduced into drying zone 11 is covered with a partially water miscible liquid which for the purpose of illustration is taken to be butanol. The butanol is introduced into drying zone 11 by means of line 12. Drying zone 11 is heated to remove overhead water and butanol by means of line 13, which overhead mixture is condensed in condensing zone 14 and introduced into separation zone 15. The water layer is removed from separation zone 15 be means of line 16 while the butanol is returned to drying zone 11 by means of line 17.

After no more water separates in separation zone 15 the excess butanol is decanted by means of line 18 and the hydrogel further heated to completely remove the butanol which is removed from the system by means of line 19. The thoroughly dried hydrogel is likewise removed from the system by means of line 20. It is to be understood that the respective lines contain the necessary valves and handling means in order to regulate the flow of the respective streams.

Although this invention is not to be limited to any theory of what occurs during the drying, it is believed that the cause of the small pore size in the gel dried in air and then heated to 850°, 1200° F. is due to the fact that the walls of the pores in the hydrogel are in a plastic condition during drying and that as a result of the high surface tension of the water the capillary pores are pulled together as the water is evaporated. On the other hand when a partially water-miscible liquid displaces the water in the pores of the hydrogel, the tendency of the pore walls to be pulled together is greatly decreased due to the lower surface tension of the liquid used. Furthermore during the displacement there is a slight shrinkage of the capillaries, but most of the shrinkage occurs during the step of removing the partially-miscible liquid from the pores after it has displaced the water. From this it is evident that the pore size and therefore the apparent density of the dried gel can be controlled by using liquids of different surface tensions. It is important that the liquid used be only partially-miscible with water. If a completely water-miscible liquid is used practically no shrinkage occurs during displacement of the water, all the shrinkage occurring during the drying step, with the result that the dry gel will have very large pores and an apparent density which will be below that which can be successfully used in a fluid catalyst system. It is particularly important that the catalyst used in the fluid catalyst process have an apparent density above 0.3 so that advantage can be taken of the pseudo-hydraulic pressure of the fluidized mass of catalyst in the various standpipes in the system so as to aid in circulating the catalyst.

Suitable partially water-miscible liquids which can be used according to this invention include normal butyl alcohol, secondary butyl alcohol, methyl ethyl ketone, diethyl ketone, mesityl oxide, butyl aldehyde, propio-nitrile, acrylonitrile, valeric acid, nitro methane, etc.

The following table illustrates the advantageous properties of various gel catalysts dried in the above described manner using butanol as the low surface-tension liquid.

TABLE I

*Physical characteristics and activity of cracking catalysts*

| Catalyst | Treatment | Mean Pore Diam.[1] | Saturation Volume[2] | Specific Surface M.²/g. | Cracking Tests | | | | Carbon Formed[4] |
|---|---|---|---|---|---|---|---|---|---|
| | | | | | 850° F. | | 1600° F. | | |
| | | | | | D+L%[3] | Wt.[6] | D+L% | Wt.[6] | |
| A | 850° F. | 25 | 259 | 500 | 47 | .76 | 39.0 | 0.49 | 100 |
| | Steamed[5] | 70 | 181 | 130 | 24 | 0.65 | | | 85 |
| B | 850° F. | 80 | 985 | 700 | 56.5 | 1.12 | 46.0 | 0.76 | 84 |
| | Steamed[5] | 130 | 483 | 154 | 27.5 | 0.97 | | | 85 |
| C | 850° F. | 20 | 52 | 360 | 57 | | | | 99 |
| | Steamed[5] | | | | 22 | | | | |

Catalyst A—An ordinary commercial silica-alumina gel.
Catalyst B—silica-alumina gel spheres (butanol dried, low density).
Catalyst C—silica-alumina gel spheres (air dried, high density).
[1] Angstrom units.
[2] Cc. N₂ adsorbed standard temperature and pressure/gm.
[3] Distillate plus loss from Engler distillation of product obtained by cracking light East Texas gas oil with the catalyst under standardized conditions.
[4] Percent correlation fresh commercial silica-alumina gel.
[5] 2.4 hours at 1050° F., 60 lbs./sq. in. gage.
[6] Weight of cracked product formed as in (3) per hour per weight of catalyst.

From the above data it is evident that a catalytic gel having larger pore size, a higher specific surface and which is subject to less carbon formation is obtained by drying in the presence of butanol in accordance with the present invention.

In order to further illustrate the invention the following examples are given which should not be construed as limiting the same in any manner whatsoever. The apparent densities used in the following examples and elsewhere in the specification were determined by gradually heating 150 grams of the catalyst to 1000° F. in a period of two hours and maintaining the temperature at 1000° F. for three hours thereafter. After cooling, the weight and volume of 100 ml. is determined. The volume is taken as the constant value reached after tapping a cylinder containing the sample. The apparent density is reported as the weight in grams per milliliter.

EXAMPLE 1

A silica sol was prepared by adding with stirring a 25 Bé. solution of sodium silicate (Na$_2$O: 3.25 SiO$_2$) to an equal volume of 23 Bé. sulphuric acid. The sol was stirred into ten times its volume of mineral seal oil containing 0.1 cc. Alkaterge-O, a commercial wetting agent sold by Commercial Solvents Corporation, per gallon of oil. The emulsion was agitated for one hour at which time the sol had set to spherical particles of hydrogel having diameters less than 1 mm. The mixture was placed in a vessel partly filled with water whereupon the hydrogel was transferred from the oleaginous to an aqueous suspension. The oil was decanted for use in subsequent preparations. The hydrogel microspheres of silica were washed free of sulphate ion by upward percolation with distilled water. After washing the water was drained off and the hydrogel covered with a solution of aluminum sulphate solution of concentration equivalent to 0.42 pound of Al$_2$O$_3$ per gallon of solution. Six gallons of solution was used for each 100 pounds of hydrogel. After an hour the excess aluminum sulphate solution was drained off and the hydrogel treated with 3% ammonium hydroxide solution using six gallons of solution per 100 pounds of hydrogel. Soaking in the ammonia solution continued one hour, at the end of which time the mixture reacted barely acid to litmus. The impregnated hydrogel was rewashed in distilled water till free of sulphate ion. The purified impregnated hydrogel microspheres were filtered off and separated into two portions for the preparation of the following catalysts:

*Catalyst A.*—A portion of the above impregnated hydrogel was dried in air in a steam oven according to common practice. The particles stuck together badly so that the value of their individual spherical nature was largely lost. By analysis the catalyst contained 13.1% Al$_2$O$_3$; its apparent density was 0.92; its surface area (by the Emmett adsorption isotherm method as described in "Symposium on New Methods for Particle Size Determination in the Subsieve Range," A. S. T. M. 3/4/41, pp. 95–105) was 360 square meters per gram. In a gas oil cracking test at 850° F. using standard volume of catalyst and of feed the product had a D+L at 400° F. of 57%. In a similar test after heating for 3 hours at 1600° F. the catalyst gave a product which had a D+L at 400° F. of 30%. After treating 24 hours with 60 lbs./sq. in. gage steam pressure at 1050° F. it gave a product which had a D+L at 400° F. of 22%.

*Catalyst B.*—The second portion of the above impregnated hydrogel was covered with butanol in a still fitted with a reflux condenser and a trap to separate water from the condensed butanol. The mixture was refluxed till water ceased collecting in the trap. The catalyst was separated from the excess butanol and placed in a steam oven to remove adsorbed butanol. The individual particles of this catalyst had no tendency to stick together so that full benefit of their spherical shape could be realized. By analysis the catalyst contained 13.1% Al$_2$O$_3$; its apparent density was 0.36; its surface area was 730 square meters per gram. In a cracking test at 850° F., using standard volumes of catalyst and feed, the product had a D+L at 400° F. of 57%. After heating 3 hours at 1600° F. the catalyst gave a product which had a D+L at 400° F. of 46%. After treating 24 hours with 60 p. s. i. g. steam at 1050° F. it gave a product which had a D+L at 400° F. of 27%.

EXAMPLE 2

A silica sol prepared from equal volumes of 25 Bé. sodium silicate and 23 Bé. sulphuric acid was caused to set while dispersed in 10 times its volume of mineral seal oil. The product, consisting of silica hydrogel microspheres, was washed free of sulphate ion with distilled water. It was filtered and divided into two portions for the following experiments.

*Experiment A.*—A portion of the washed silica hydrogel microspheres was dried in a steam oven according to the usual procedure. The particles stuck together badly so that the effect of their spherical nature was largely lost. The dry gel had an apparent density of 0.75 and a surface area of 745 square meters per gram.

*Experiment B.*—The other portion of silica hydrogel microspheres was dried by refluxing in butanol over a water trap as described in Example 1. The dried gel had an apparent density of 0.3 and a surface area of 1095 square meters per gram.

From the above examples it is clear that spheres of gel catalysts can be prepared which can be used in the fluid catalyst process without further grinding, since the method described of drying hydrogel spheres in the presence of a partially-water miscible liquid results in the formation of particles which retain their original discrete form and do not tend to form larger aggregates. Furthermore the apparent density of the particles is above 0.3 and therefore is sufficiently high to exert the desired pseudo hydraulic pressure in a fluid catalyst system.

Although the invention has been described in connection with the drying of hydrogel spheres, it is to be understood that the process of this invention in its broadest concept is adapted to the drying of any type of hydrogel in whatever shape it may be formed. Furthermore the precise details enumerated in the above examples obviously are not fixed and numerous modifications of the procedures of these examples may be made by those skilled in the art without departing from the spirit of the invention.

The nature and objects of the present invention having thus been fully set forth and specific examples of the same given what is claimed as new and useful and desired to be obtained by Letters Patent is:

1. Process for preparing dry adsorbent gels from hydrogels which comprises mixing said hydrogel with normal butanol, distilling the water from said hydrogel as an azeotrope with said butanol at least until the particles are no longer capable of agglomorating and removing the butanol from the dehydrated hydrogel.

2. Process for preparing dry silica gel spheres from hydrogel spheres which comprises refluxing said silica hydrogel spheres with normal butanol until the water is completely removed, decanting the excess butanol from the hydrogel and heating the dehydrated gel to drive off residual butanol.

3. Process for preparing dry adsorbent gels from hydrogels which comprises adding to said hydrogels an organic liquid which is partially miscible in water and heating the mixture of hydrogel and partially water miscible organic liquid to remove overhead water and the partially water-miscible liquid at least until the hydrogel particles are no longer capable of agglomerating.

4. Process for preparing dry adsorbent gels which comprises reacting sodium silicate and sulphuric acid in a large volume of oil, maintaining the reaction mixture of sodium silicate and sulfuric acid dispersed in the oil until silica hydrogel particles are formed introducing the oil dispersion of hydrogel particles into water, and removing the oil, then introducing the hydrogel into a drying zone into which butanol is added, heating the mixture of hydrogel particles and butanol to remove overhead water and butanol, condensing the overhead fraction and passing the same to a separation zone whereby segregation of water and butanol occurs, removing the water from the system and returning the butanol to the drying zone, then after water no longer separates in the separation zone removing the butanol from the drying zone, whereby a dry adsorbent gel results, removing said dry adsorbent gel from said drying zone.

5. A process for the manufacture of small inorganic oxide gel spheres which comprises forming an inorganic hydrosol capable of setting into an inorganic hydrogel, dispersing said hydrosol in a water-immiscible liquid, agitating said liquid to maintain the hydrosol in finely dispersed droplet form until said droplets have set into a firm hydrogel and thereafter heating the hydrogel particles in admixture with an organic liquid which is partially miscible with water so that water is removed by vaporization at least until the particles are no longer capable of agglomerating.

6. The process of preparing inorganic oxide gel catalysts in the form of microspheroidal particles which comprises coagulating droplets of a suitable metastable sol in a water-immiscible fluid coagulating bath in which the droplets are supported out of contact with each other, separating the resulting particles from the bath and mixing them with an organic liquid, which is partially miscible with water and heating said mixture so that the water is removed by vaporization at least until the particles are no longer capable of agglomerating.

JERRY A. PIERCE.
CHARLES N. KIMBERLIN, Jr.

REFERENCES CITED

The following references are of record in the file of this patent:

UNITED STATES PATENTS

| Number | Name | Date |
| --- | --- | --- |
| 1,712,830 | Kyrides | May 14, 1929 |
| 1,755,496 | Behrman | Apr. 22, 1930 |
| 1,843,576 | McClure | Feb. 2, 1932 |
| 1,989,541 | Blanchod | Jan. 29, 1935 |
| 2,138,048 | Vesce | Nov. 29, 1938 |
| 2,152,716 | Van Wirt et al. | Apr. 4, 1939 |
| 2,249,767 | Kistler | July 22, 1941 |
| 2,272,301 | Kinneberg et al. | Feb. 10, 1942 |
| 2,282,303 | Morrison | May 12, 1942 |
| 2,360,186 | Wyler | Oct. 10, 1944 |

FOREIGN PATENTS

| Number | Country | Date |
| --- | --- | --- |
| 222,279 | Great Britain | Oct. 2, 1924 |

OTHER REFERENCES

Neuhausen et al., "Organogels of Silicic Acid," pp. 1844–1846, J. A. C. S., vol. 43 (1920).